(12) United States Patent
Becher et al.

(10) Patent No.: US 11,487,266 B2
(45) Date of Patent: Nov. 1, 2022

(54) METHOD FOR RECOGNIZING CONTINGENCIES IN A POWER SUPPLY NETWORK

(71) Applicant: Siemens Aktiengesellschaft, Munich (DE)

(72) Inventors: Silvio Becher, Munich (DE); Denis Krompaß, Munich (DE); Andreas Litzinger, Fürth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 669 days.

(21) Appl. No.: 16/002,095

(22) Filed: Jun. 7, 2018

(65) Prior Publication Data

US 2019/0004490 A1 Jan. 3, 2019

(30) Foreign Application Priority Data

Jun. 28, 2017 (EP) ..................................... 17178395

(51) Int. Cl.
*G05B 19/048* (2006.01)
*H02J 3/00* (2006.01)
(Continued)

(52) U.S. Cl.
CPC ........... *G05B 19/048* (2013.01); *G06N 20/00* (2019.01); *G06Q 10/06* (2013.01); *G06Q 50/06* (2013.01);
(Continued)

(58) Field of Classification Search
CPC ...... G05B 19/048; G06Q 10/06; G06N 20/00; H02J 3/001; H02J 13/00002;
(Continued)

(56) References Cited

U.S. PATENT DOCUMENTS

2011/0202191 A1 8/2011 Franke et al.
2020/0169085 A1* 5/2020 Becher ............... G06Q 10/0631

FOREIGN PATENT DOCUMENTS

EP 3173991 A1 5/2017

OTHER PUBLICATIONS

Chiang et al., Toward Real-Time Detection of Critical Contingency of Large Power Systems, 2013 IEEE, 5 pp. (Year: 2013).*
(Continued)

*Primary Examiner* — Toan M Le
(74) *Attorney, Agent, or Firm* — Schmeiser, Olsen & Watts LLP

(57) ABSTRACT

A monitoring system for recognizing a contingency in a power supply network including in-field measurement devices adapted to generate measurement data of the power supply network and a processing unit adapted to process the measurement data generated by the in-field measurement devices of the power supply network by using a local network state estimation model to calculate local network state profiles used to generate a global network state profile, wherein the processing unit is further adapted to process the measurement data generated by the in-field measurement devices of the power supply network to provide a relevance profile including for the in-field measurement devices a relevance distribution indicating a probability where the origin of a contingency within the power supply network.

18 Claims, 14 Drawing Sheets

(51) Int. Cl.
  *G06Q 50/06* (2012.01)
  *G06N 20/00* (2019.01)
  *G06Q 10/06* (2012.01)
  *H02J 13/00* (2006.01)

(52) U.S. Cl.
  CPC ............... *H02J 3/00* (2013.01); *H02J 3/001* (2020.01); *H02J 13/00* (2013.01); *H02J 2203/20* (2020.01)

(58) Field of Classification Search
  CPC ..... H02J 2203/20; H02J 3/0012; Y02B 90/20; Y04S 10/30; Y04S 20/00; Y04S 40/20; Y02P 80/14; Y02E 60/00
  See application file for complete search history.

(56) References Cited

OTHER PUBLICATIONS

IEEE Xplore Search Result, Dec. 30, 2020, 1 pp. (Year: 2020).*
Behera et al., An Unique Approach for Voltage Stability Improvement with Probabilistic Neural Network, 2015 IEEE, 5 pp. (Year: 2015).*
IEEE Xplore Search Results, May 11, 2021, 1 pp. (Year: 2021).*
Ugedo et al., Generator Load Profiles Estimation Using Artificial Intelligence, 2007 International Conference on Intelligent Systems Applications to Power Systems, 6 pp. (Year: 2007).*
Abstract of Ugedo et al., 2007, 1 pp. (Year: 2007).*

* cited by examiner

METHOD FOR RECOGNIZING CONTINGENCIES IN A POWER SUPPLY NETWORK

CROSS-REFERENCE TO RELATED APPLICATIONS

This application claims priority to European application No. EP17178395 having a filing date of Jun. 28, 2017 the entire contents of both of which are hereby incorporated by reference.

FIELD OF TECHNOLOGY

The following relates to a method for recognizing contingencies in a power supply network and in particular to a data driven approach for recognizing contingencies in an electrical grid.

BACKGROUND

A power supply network such as an electrical power supply grid is a complex system comprising a plurality of subsystems and/or components. These components include in-field measurement devices such as phasor measurement units PMUs. Phasor measurement units can measure electrical waves on an electrical grid. Phasor measurement units can for instance measure 3-phase current phasors (magnitude and angle), 3-phase voltage phasors and their frequency. In large power supply networks, the in-field measurement devices, in particular the PMUs can be located at strategic sites to monitor the state of the whole power supply network. Different kinds of contingencies can occur in the power supply network. Some contingencies such as generator or line trips can have an impact on the stability of the power supply network and can be visualized through the data that is generated by the in-field measurement devices of the power supply network. In-field measurement devices, in particular PMUs, can provide measurement data with a high resolution. However, this leads to huge amounts of measurement data generated by the in-field measurement devices which have to be processed by a processing unit. Even though the contingencies in the power supply network can be visualized through the recorded measurement data, the analysis of the received huge amount of measurement data has to be done by experienced engineers manually. The measurement data received by the in-field measurement devices of the power supply network are for instance analyzed to detect a root cause of the observed contingency. Since the analysis of the huge amount of measurement data is mostly performed manually, the analysis is very cumbersome and time-consuming. In addition, the analysis of the measurement data does not have an impact on the actual decisions that are taken during the event of the contingency due to the large delay of insights about the observed contingency caused by the complex manual analysis. For example, a manual analysis of measurement data received by in-field measurement devices of a power supply network in response to a contingency event can take up to three months. However, in case of a contingency which threatens the stability of the power supply network decisions have to be made in less than a minute to be effective.

SUMMARY

An aspect relates to providing a method and system for recognizing contingencies in a power supply network automatically in short time.

Embodiments of the invention provided according to a first aspect a method for recognizing a contingency in a power supply network, the method comprising the steps of: processing measurement data generated by in-field measurement devices of said power supply network by a local network state estimation model to calculate local network state profiles; generating a global network state profile from the local network state profiles, processing the measurement data generated by the in-field measurement devices of said power supply network to provide a relevance profile comprising for the in-field measurement devices a relevance distribution indicating a probability where the origin of a contingency within the power supply network resides, and computing a similarity between a candidate contingency profile being formed by the generated global network state profile and formed by the calculated relevance profile and reference contingency profiles stored in a reference contingency database to identify the reference contingency profile having the highest computed similarity as the recognized contingency.

In a possible embodiment of the method for recognizing a contingency in a power supply network according to the first aspect of embodiments of the present invention, the local network state profile comprises a local contingency class probability profile comprising for the in-field measurement devices a class probability distribution over contingency classes.

In a further possible embodiment of the method according to the first aspect of the present invention, the local network state profile comprises a local latent contingency profile.

In a still further possible embodiment of the method according to the first aspect of the present invention, the in-field measurement devices comprise phasor measurement units which provide time series of measurement data in different measurement channels.

In a still further possible embodiment of the method for recognizing a contingency in a power supply network according to the first aspect of the present invention, the local network state estimation model is formed by a model which generates a latent feature representation of the local network state such as a tensor factorization model.

In a still further possible embodiment of the method according to the first aspect of the present invention, each reference contingency profile stored in the reference contingency database comprises a reference global network state profile and a reference relevance profile.

In a still further possible embodiment of the method according to the first aspect of the present invention, a similarity metric indicating a similarity between the candidate contingency profile and a reference contingency profile is computed for each reference contingency profile stored in the reference contingency database depending on the global network state profile of the candidate contingency profile and depending on the global network state profile of the respective reference contingency profile.

In a still further possible embodiment of the method according to the first aspect of the present invention, the used similarity metric comprises a weighted cosine similarity metric.

In a still further possible embodiment of the method according to the first aspect of the present invention, the measurement data generated by each in-field measurement device of the power supply network is preprocessed to provide a standard deviation of the measurement data from an expected value in a steady state for each measurement channel of the respective in-field measurement device.

In a still further possible embodiment of the method according to the first aspect of the present invention, the preprocessed measurement data is rescaled by dividing it through the channel and in-field measurement device specific standard deviation.

In a still further possible embodiment of the method according to the first aspect of the present invention, a relevance weight is calculated for each in-field measurement device by normalizing the standard deviation of the measurement data of the respective in-field measurement device to provide the relevance profile.

In a still further possible embodiment of the method according to the first aspect of the present invention, the local network state estimation models are trained with measurement data of observed contingencies of the power supply network.

Embodiments of the invention provided according to the second aspect a monitoring system adapted to recognize a contingency in a power supply network, the monitoring system comprising: in-field measurement devices adapted to generate measurement data of said power supply network and a processing unit adapted to process the measurement data generated by the in-field measurement devices of the power supply network by using a local network state estimation model to calculate local network state profiles and to generate a global network state profile, wherein said processing unit is further adapted to process the measurement data generated by the in-field measurement devices of said power supply network to provide a relevance profile comprising for the in-field measurement devices a relevance distribution indicating a probability where the origin of a contingency within the power supply network resides, wherein the processing unit is further adapted to compute a similarity between a candidate contingency profile formed by the generated global network state profile and by the calculated relevance profile and reference contingency profiles stored in a reference contingency database of said monitoring system to identify the reference contingency profile having the highest computed similarity as the recognized contingency within the power supply network.

In a possible embodiment of the monitoring system according to the second aspect of the present invention, the in-field measurement devices comprise phasor measurement units which are adapted to provide time series of measurement data in different measurement channels.

Embodiments of the invention further provide according to a third aspect a method for recognizing contingencies in a power supply network comprising the steps of: processing measurement data generated by in-field measurement devices of said power supply network by associated neural attention models to provide a global network state profile of the power supply network comprising for the in-field measurement devices of said power supply network a class probability distribution over contingency classes, processing the measurement data generated by the in-field measurement devices of said power supply network to provide a relevance profile of said power supply network comprising for the in-field measurement devices a relevance distribution indicating a probability where the origin of a contingency within the power supply network resides, and comparing the calculated global network state profile of said power supply network and the calculated relevance profile of said power supply network with reference contingency profiles stored in a reference contingency database to recognize contingencies in said power supply network.

In a possible embodiment of the method according to the third aspect of the present invention, each neural attention model associated with a corresponding in-field measurement device is used to calculate a local network state profile for the power supply network at the respective in-field measurement device.

In a further possible embodiment of the method according to the third aspect of the present invention, the local network state profiles of the different in-field measurement devices are concatenated to provide the global network state profile of the power supply network.

In a still further possible embodiment of the method according to the third aspect of the present invention, the in-field measurement devices comprise phasor measurement units which provide time series of measurement data in different measurement channels.

In a still further possible embodiment of the method according to the third aspect of the present invention, the neural attention model comprises a convolutional layer to smooth measurement data received by an associated in-field measurement device of the power supply network.

In a still further possible embodiment of the method according to the third aspect of the present invention, the neural attention model associated with a corresponding in-field measurement device of the power supply network comprises at least one recurrent neural network layer to capture the time dependency of the received measurement data.

In a still further possible embodiment of the method according to the third aspect of the present invention, the neural attention model associated with an in-field measurement device of the power supply network comprises an attention layer which weights outputs of the last recurrent neural network layer of said neural attention model with the output of an associated feed-forward attention subnetwork receiving channel-wise context information data indicating a steady state of the power supply network at the respective in-field measurement device.

In a still further possible embodiment of the method according to the third aspect of the present invention, the neural attention model associated with a corresponding in-field measurement device of the power supply network comprises a classification layer which receives the weighted outputs of the last recurrent neural network layer of said neural attention network to calculate a local network state profile for the power supply network at the respective in-field measurement device indicating a predicted class probability distribution over contingency classes.

In a still further possible embodiment of the method according to the third aspect of the present invention, each reference contingency profile stored in the reference contingency database comprises a reference global network state profile and a reference relevance profile.

In a still further possible embodiment of the method according to the third aspect of the present invention, a similarity metric indicating a similarity between a candidate contingency profile formed by the global network state profile and the relevance profile of the power supply network and a reference contingency profile is computed for each reference contingency profile stored in the reference contingency database depending on the global network state profile of the candidate contingency profile and depending on the global network state profile of the respective reference contingency profile.

In a still further possible embodiment of the method according to the third aspect of the present invention, for each reference contingency profile stored in the reference contingency database, a first similarity metric is calculated depending on the global network state profile of the candidate contingency profile and depending on the global network state profile of the reference contingency profile and a second similarity metric is computed depending on the relevance profile of the candidate contingency profile and depending on the relevance profile of the reference contingency profile.

In a still further possible embodiment of the method according to the third aspect of the present invention, a similarity metric indicating a similarity between the candidate contingency profile and the reference contingency profile is computed as a function of the calculated first similarity metric and the calculated second similarity metric.

In a further possible embodiment of the method according to the third aspect of the present invention, a similarity metric indicating a similarity between the candidate contingency profile and a reference contingency profile is computed as an average of the first similarity metric and the second similarity metric.

In a possible embodiment of the method according to the third aspect of the present invention, the measurement data generated by each in-field measurement device of said power supply network is preprocessed to provide a standard deviation of the measurement data from an expected value in a steady state for each measurement channel of the respective in-field measurement device.

In a possible embodiment of the method according to the third aspect of the present invention, the preprocessed measurement data is rescaled by dividing it through the channel and in-field measurement device specific standard deviation.

In a further possible embodiment of the method according to the third aspect of the present invention, a relevance weight is calculated for each in-field measurement device by normalizing the standard deviation of the measurement data of the respective in-field measurement device to provide the relevance profile of the power supply network.

In a further possible embodiment of the method according to the third aspect of embodiments of the present invention, the neural attention models are trained with measurement data of observed contingencies of the power supply network.

Embodiments of the invention further provide according to a fourth aspect a monitoring system adapted to recognize contingencies in a power supply network, said monitoring system comprising: in-field measurement devices adapted to generate measurement data of said power supply network, a processing unit adapted to process the measurement data generated by the in-field measurement devices of said power supply network by associated neural attention models to provide a global network state profile of the power supply network comprising for the in-field measurement devices of the power supply network a class probability distribution over contingency classes, wherein the processing unit is further adapted to process the measurement data generated by the in-field measurement devices of the power supply network to provide a relevance profile of said power supply network comprising for the in-field measurement devices a relevance distribution indicating a probability where the origin of a contingency within the power supply network resides, wherein the processing unit is further adapted to compare the calculated global network state profile of said power supply network and the calculated relevance profile of said power supply network with reference contingency profiles stored in a reference contingency database of said monitoring system to recognize contingencies in said power supply network.

In a possible embodiment of the monitoring system according to the fourth aspect of the present invention, the in-field measurement devices comprise phasor measurement units which provide time series of measurement data in different measurement channels.

In a possible embodiment of the monitoring system according to the fourth aspect of the present invention, each neural attention model comprises a convolutional layer adapted to smooth measurement data received by an associated in-field measurement device of the power supply network, at least one recurrent neural network layer adapted to capture a time dependency of the received measurement data, and a classification layer adapted to weight the received outputs of the last recurrent neural network layer of said neural attention network to calculate a local network state profile for the power supply network at the respective in-field measurement device indicating a predicted class probability distribution over contingency classes.

In the following, possible embodiments of the different aspects of the present invention are described in more detail with reference to the enclosed figures.

BRIEF DESCRIPTION

In the cases where the modelling of Long-Term dependencies is required, the recurrent neural network layer consists of Gated Recurrent Units, GRUs, of Long-Term Short-Term Memory (LSTM) which enable the network to capture these Long-Term dependencies.

DETAILED DESCRIPTION

Figure 1:
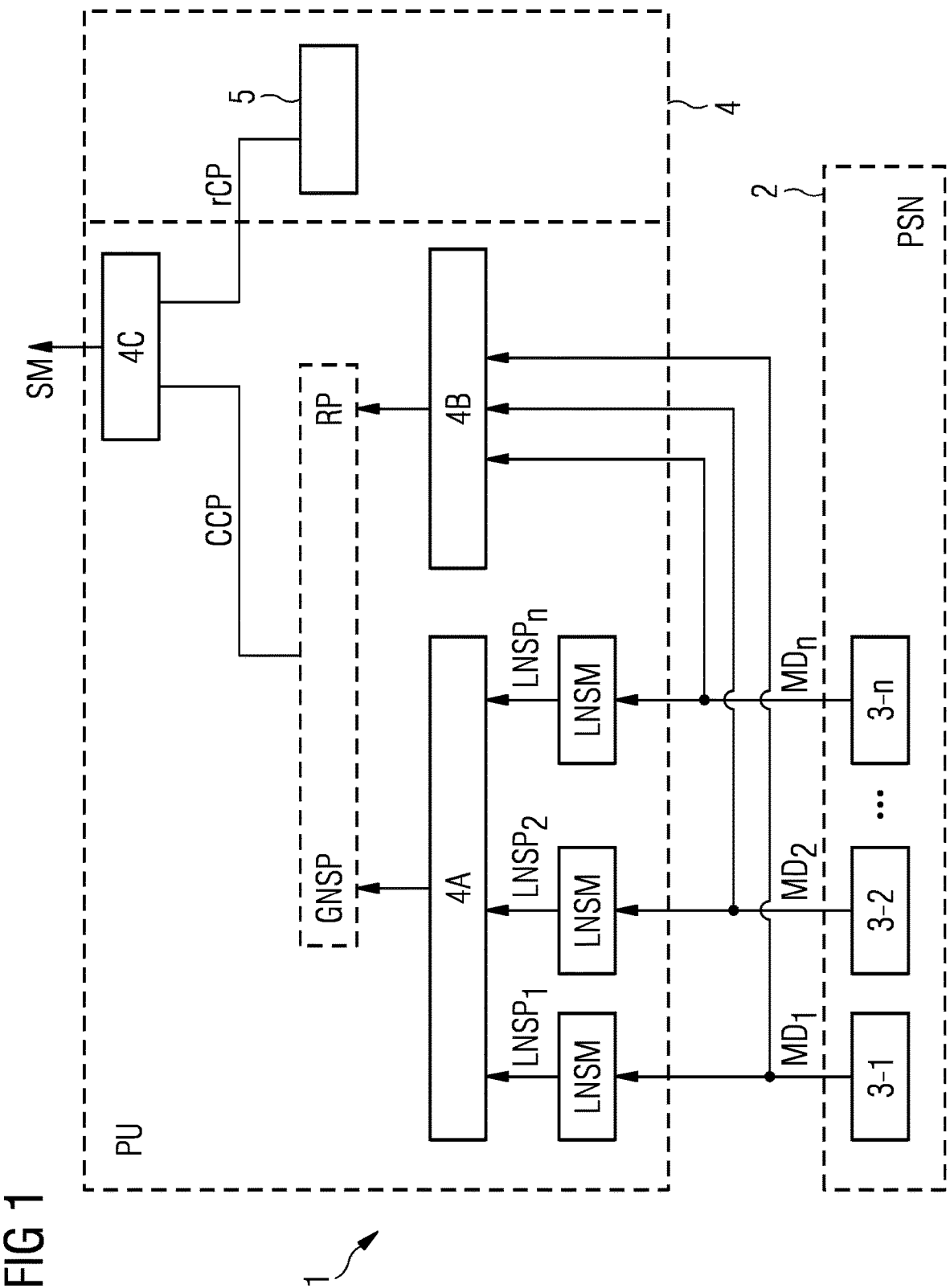
FIG. 1 shows a block diagram of an exemplary embodiment of a monitoring system for recognizing contingencies in a power supply network.

As can be seen in the schematic block diagram of FIG. 1, a monitoring system 1 according to an aspect of embodiments of the present invention is adapted in the illustrated embodiment to recognize contingencies in a power supply network 2. The power supply network 2 can be any kind of network supplying power to power consumption entities. In a possible embodiment, the power supply network 2 is formed by an electrical grid providing electrical power to consumption devices. The monitoring system 1 comprises in the illustrated embodiment in-field measurement devices 3-1, 3-2 . . . 3-n adapted to generate measurement data MD of the power supply network 2. In a possible embodiment, the in-field measurement devices 3-i comprise different kinds of sensors adapted to generate different kinds of measurement data MD of the power supply network 2. In a possible embodiment, the in-field measurement devices 3-i include phasor measurement units PMUs. The phasor measurement units PMUs measure electrical waves of the power supply network 2, in particular phase current phasors, phase voltage phasors and their frequency. In-field measurement devices 3-i can include other sensor devices as well. For instance, the in-field measurement devices 3-i can also include devices providing environmental data such as temperature or the like.

The monitoring system 1 comprises in the illustrated embodiment of FIG. 1 a processing unit 4 adapted to process the measurement data MD generated by the in-field measurement devices 3-i of the power supply network 2 by associated neural attention models to provide a global network state profile GNSP of the power supply network 2 comprising for the in-field measurement devices 3-i of the power supply network 2 a class probability distribution over contingency classes. The processing unit 4 of the monitoring system 1 is further adapted to process the measurement data MD generated by the in-field measurement devices 3-i of the power supply network 2 to provide a relevance profile RP of the power supply network 2 comprising for the in-field measurement devices 3-i a relevance distribution indicating a probability where the origin of a contingency within the power supply network 2 resides.

As can be seen in FIG. 1, the measurement data MD generated by the in-field measurement devices 3-i of the power supply network 2 are processed by a local network state estimation model LNSM to calculate local network state profiles LNSP. A generation unit 4A of the processing unit 4 is adapted to generate a global network state profile unit GNSP from the local network state profiles LNSP as illustrated in FIG. 1.

The measurement data MD generated by the in-field measurement devices 3-i of the power supply network 2 are further processed by a processor 4B of the processing unit 4 to provide a relevance profile RP as illustrated in FIG. 1. The relevance profile RP comprises for the in-field measurement devices 3-i a relevance distribution indicating a probability where the origin of a contingency within the power supply network 2 resides.

As can be seen in FIG. 1, a candidate contingency profile CCP is formed by the generated global network state profile GNSP and by the calculated relevance profile RP.

The processing unit 4 of the monitoring system 1 further comprises a computation unit 4C adapted to compute a similarity between the candidate contingency profile CCP and reference contingency profiles rCP stored in a reference contingency database 5 of the monitoring system 1 to identify the reference contingency profile rCP having the highest computed similarity as being the recognized contingency within the power supply network 2.

In a possible embodiment of the monitoring system 1 as illustrated in FIG. 1, the local network state profiles LNSPi comprise each a local contingency class probability profile comprising for the different in-field measurement devices 3-i of the power supply network 2 a class probability distribution over contingency classes. In an alternative embodiment, each local network state profile LNSP can also comprise a local latent contingency profile.

The in-field measurement devices 3-i of the power supply network 2 can comprise phasor measurement units PMUs which provide time series of measurement data in different measurement channels c. The local network state estimation model LNSM can be formed in a possible embodiment by a neural attention model. The neural attention model can comprise a convolutional layer to smooth measurement data MD received by associated in-field measurement devices 3-i. The neural attention model further can comprise in a possible embodiment at least one recurrent neural network, RNN, layer followed by a neural attention layer.

Each reference contingency profile rCP stored in the reference contingency database 5 can comprise in a possible embodiment a reference global network state profile rGNSP and a reference relevance profile rRP.

In a possible embodiment of the monitoring system 1 as illustrated in FIG. 1, a similarity metric SM indicating a similarity between the candidate contingency profile CCP and a reference contingency profile rCP is computed by the computation unit 4C for each reference contingency profile rCP stored in the reference contingency database 5 depending on the global network state profile GNSP of the candidate contingency profile CCP and depending on the global network state profile GNSP of the respective reference contingency profile rCP read from the database 5. The computed similarity metric SM can comprise in a possible implementation a weighted cosine similarity metric.

In a possible embodiment of the monitoring system 1 as shown in FIG. 1, for each reference contingency profile rCP stored in the reference contingency database 5, a first similarity metric SM1 and a second similarity metric SM2 is computed. The first similarity metric SM1 is calculated depending on the global network state profile GNSP of the candidate contingency profile CCP and depending on the global network state profile GNSP of the reference contingency profile rCP. The second similarity metric SM2 is computed depending on the relevance profile RP of the candidate contingency profile CCP and depending on the relevance profile RP of the reference contingency profile rCP. Further, a final similarity metric SM is then computed as a function of the calculated first similarity metric SM1 and the calculated second similarity metric SM2 by the computation unit 4C. The similarity metric SM indicating a similarity between the candidate contingency profile CCP and the reference contingency profile rCP is computed in this embodiment as a function of the calculated first similarity metric SM1 and the calculated second similarity metric SM2. In a possible specific embodiment, a similarity metric SM indicating a similarity between the candidate contingency profile CCP and a reference contingency profile rCP is computed by the computation unit 4C as an average of the first similarity metric SM1 and the second similarity metric SM2.

In a possible embodiment, the measurement data MD generated by each in-field measurement devices 3-$i$ of the power supply network 2 can be preprocessed to provide a standard deviation of the measurement data from an expected value in a steady state for each measurement channel of the respective in-field measurement device 3-$i$. Then, the preprocessed measurement data MD can be rescaled by dividing it through the channel and in-field measurement device specific standard deviation. In a possible embodiment, a relevance weight is calculated for each in-field measurement device 3-$i$ by normalizing the standard deviation of the measurement data MD of the respective in-field measurement device 3-$i$ to provide the relevance profile RP. The local network state estimation models LNSM used by the processing unit 4 can be trained in a possible embodiment with measurement data of observed contingencies of the power supply network 2.

Figure 2:
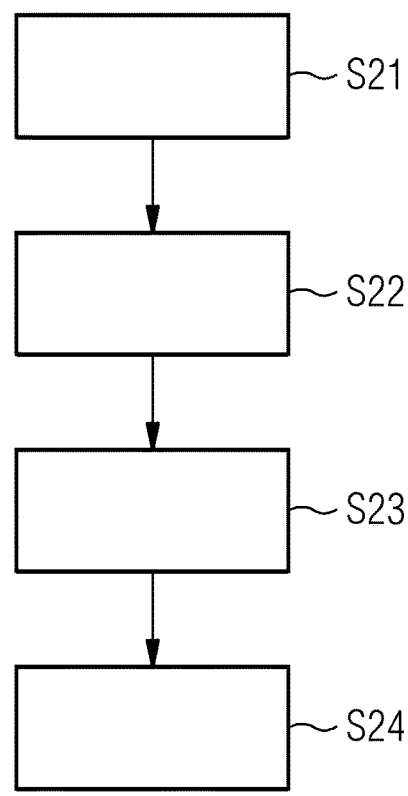
FIG. 2 shows a flowchart of an exemplary embodiment of a method for recognizing a contingency in a power supply network.

FIG. 2 shows a flowchart of a possible exemplary embodiment of a method for recognizing contingencies in a power supply network 2 according to a first aspect of embodiments of the present invention. In the illustrated embodiment, the method comprises several main steps.

In a first step S21, measurement data MD generated by in-field measurement devices 3-$i$ of the power supply network 2 are processed by a local network state estimation model LNSM to calculate local network state profiles LNSPi.

In a further step S22, the global network state profile GNSP is generated from the calculated local network state profiles LNSPi. This can be performed for instance by a generation subunit 4A of the processing unit 4.

In a further step S23, the measurement data MD generated by the in-field measurement devices 3-$i$ of the power supply network 2 are processed to provide a relevance profile RP. This relevance profile RP comprises for the in-field measurement devices 3-$i$ a relevance distribution indicating a probability where the origin of a contingency within the power supply network 2 does reside. The generation of the global network state profile GNSP in step S22 and the generation of the relevance profile RP in step S23 can also be performed in parallel to save processing time in a possible embodiment.

In a further step S24, a similarity between a candidate contingency profile CCP and reference contingency profiles rCP is computed. The candidate contingency profile CCP is formed by the generated global network state profile GNSP and by the calculated relevance profile RP as also illustrated in FIG. 1. The reference contingency profiles rCP are stored in a reference contingency database 5 of the monitoring system 1. The similarity between the candidate contingency profile CCP and the reference contingency profiles rCP read from the reference contingency database 5 is computed to identify the reference contingency profile rCP having the highest computed similarity. The identified reference contingency profile rCP showing the highest computed similarity is recognized as the contingency having occurred in the power supply network 2.

The in-field measurement devices 3-$i$ of the monitoring system 1 as illustrated in FIG. 1 can measure data on different channels c. Each channel c can comprise a time series of specific data such as a current of a phase L in an electrical grid. In a possible embodiment, the measurement data can be preprocessed. The in-field measurement devices 3-$i$ can comprise phasor measurement units PMUs. Given a set of contingency observed in the power supply network 2 simulated by a proper simulation program such as SIGUARD DSA one can observe phasors for current and phasors for voltage from each of the in-field PMU measurement devices 3-$i$ placed in the power supply network 2. First, symmetrical components and the active and reactive power from these signals can be computed. Further, for each PMU, a signal standard deviation can be estimated for each of its channels c. Further, signals can be rescaled by these values by dividing them through the channel and PMU specific standard deviation.

For example, if the power supply network 2 is monitored by 100 PMUs as in-field measurement devices 3-$i$ it is possible to measure 3-phase currents and 3-phase voltages. Accordingly, twelve sensor signals are retrieved for each PMU 3-$i$, i.e. three times a voltage amplitude, three times a voltage angle, three times a current amplitude and three times a current angle. This leads to 1200 sensor signals in total. From these sensor signals, it is possible to compute eight additional signals for each PMU coexisting of the symmetrical components of the current (three signals), the symmetrical components of the voltage (three signals) and active as well as reactive power, leading to 800 additional signals in total. Given these 800 signals, it is possible to compute 800 standard deviation values and to divide the 800 signals by the corresponding value.

For each contingency occurring in the power supply network 2, a snapshot of data is available reflecting the steady state of the power supply network 2 before the contingency has happened in the power supply network 2. This snapshot data can be used to compute a PMU-wise expected value or a mean value for each channel c and subtract these values from the measurement data MD. In this way, the subsequent calculation steps are only performed on deviations observed from the steady state. The local network state model LNSM or state estimator model can represent any kind of model that extracts some (weighted) state representation from the incoming measurement data MD. In a possible embodiment, a machine learning ML based model can be used. The machine learning ML based model can comprise a tensor factorization model or an encoder part of an encoder-decoder neural network, e.g. an auto-encoder.

In a possible embodiment, the model is trained by providing it with a set of observed contingencies preprocessed as described above. The measurement signals or measurement data MD are rescaled and only contain a deviation from an expected value of the steady state. Each set of measurements of a single PMU can be treated as a single training example. The training architecture of the model can consist of an encoder and decoder part. The encoder first projects the input sample onto a representation that is of lower dimensionality than the original input data. After this step, the decoder part of the architecture is used to reconstruct the original data from this lower dimensional representation. During the training of such an approach, the model gets penalized for not reconstructing the input samples properly. As a consequence, the model can only reduce this penalty by compressing relevant information in the lower dimensional representation (the bottleneck) that describes enough features to successfully reconstruct the original signal. During training, the model learns a mapping from the input data to these features that satisfy this goal as best as possible. In a possible embodiment, a regularized square error loss can be used between the true measurements and the measurement reconstructed from the latent state representation by the decoder.

$$L(X,\theta) = (X - f_\theta(X))^2 + \lambda \|\theta\|_2^2,$$

where L is a loss function and $\theta$ are the free parameters of the model. $f_\theta$ is the encoder-decoder network for any other bottleneck architecture such as tensor factorization. The last summand of the above equation is a regularization term on the free parameters of the model that prevents overfitting during model training.

After training, it can be assumed that the features of the encoder does map the input data on represented important characteristics of the observed input signals. As an example, these features can represent abstract concepts such as "A sharp peak followed by a slow decay". However, in general, these features are not always interpretable. With the method according to embodiments of the present invention, these methods are used as a representation of the local network state LNS captured by the individual in-field measurement device 3-$i$. They are computed by only applying the encoder part of the model on the input data as illustrated in FIG. 3.

Figure 3:
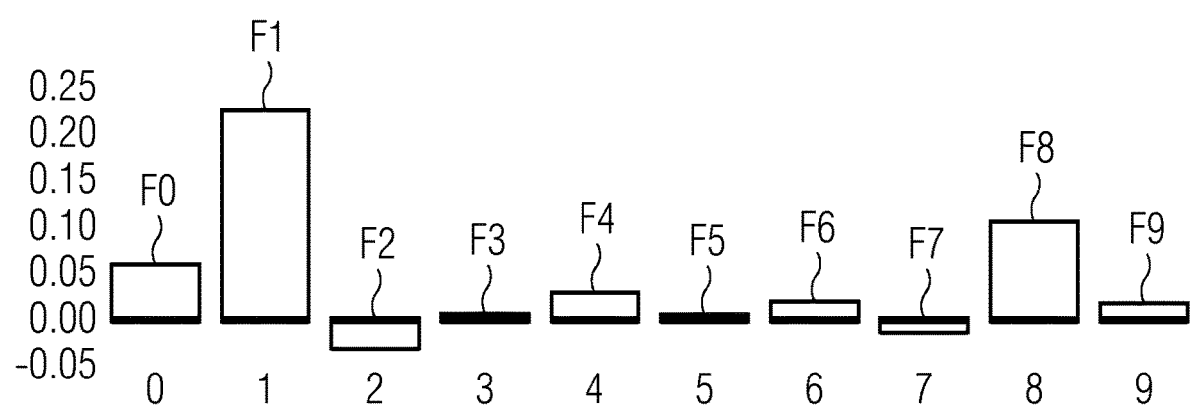
FIG. 3 shows a diagram for illustrating a local network state computed from measurement data generated by an in-field measurement device to illustrate an exemplary embodiment of a method for recognizing a contingency in a power supply network.

FIG. 3 illustrates a local network state profile LNSP computed from data of a single in-field measurement device 3-$i$. In the illustrated example, there are nine different features F1 to F9 reflecting the local network state, LNS, of the power supply network 2 at the respective in-field measurement device 3-$i$. In the illustrated example of FIG. 3, feature F1 is prominent. The local network state profile LNSP$_i$ as illustrated in the example of FIG. 3 can be supplied to the generation subunit 4A of the processing unit 4 as illustrated in FIG. 1 and used to generate the global network state profile GNSP.

Figure 4:
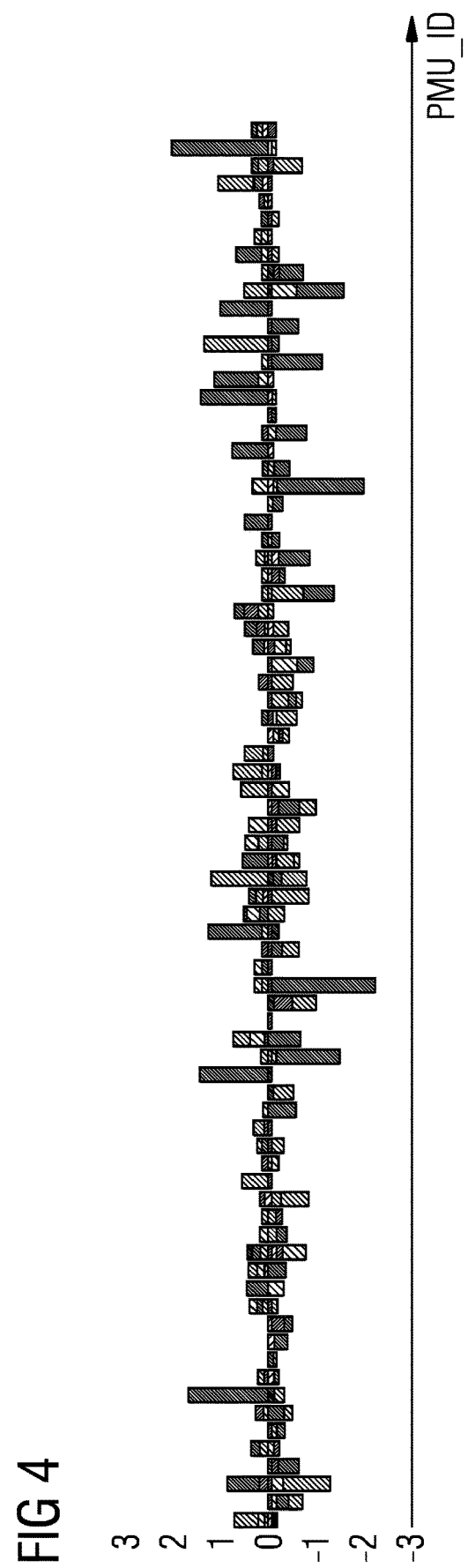
FIG. 4 illustrates a generated global network state profile used by a method and system for recognizing a contingency in a power supply network.

FIG. 4 shows schematically an example of a global network state profile GNSP. The global network state profile GNSP comprises the local network state profiles LNSP$_i$ from a plurality of in-field measurement devices 3-$i$. Each in-field measurement device 3-$i$ such as a PMU can comprise an associated measurement device ID. In a possible embodiment, the different local network state profiles LNSP can be concatenated to generate a global network state profile GNSP as illustrated in FIG. 4. For a global network state estimation for an observed contingency happening in the power supply network 2 it is possible to apply a state estimator model on every in-field measurement device 3-$i$ independently. This provides a global profile of the global network state considering all estimated local network states. In the illustrated example of FIG. 4, each bar represents the value of the nth feature of the local network state LNS computed for each PMU in the observed contingency. The x-axis of the diagram of FIG. 4 represents the different PMU IDs of the different in-field measurement devices 3-$i$.

For example, the system can be trained with training data of 50 contingencies. For each contingency, measurement data MD can be provided from 100 PMUs (the PMUs are the in-field measurement devices that monitor the target power supply network). In this example, it is possible to extract 5000 examples or samples for the model training. If, for instance, each contingency is measured for 12 time steps, a single input example can consist of 8×12=72 values. For instance, it can be assumed that one wants to learn 10 features to describe a network state. In this specific example, the model is trained by passing the 5000 examples in small batches or as a whole to the model to learn the parameters of the encoder and decoder mapping functions to optimize the reconstruction target. In this model, the encoder can learn a function $h_i = f_{enc}(X_i)$, wherein $X_i$ is the input data (72 values) and $h_i$ is the estimated network state (10 values). The decoder in turn can learn a function $\widetilde{X}_i = f_{dec}(h_i)$, wherein $\widetilde{X}_i$ is the approximated input (the reconstruction).

In a possible embodiment, an importance weighting for each in-field measurement device 3-$i$ placed in the power supply network 2 is calculated based on the preprocessed data, e.g. the signals are rescaled and only contain the deviation from the expected value of the steady state.

$$q_p = \sqrt{\sum_c \sum_t (x_{pct} - \mu_{pc})^2}$$

$$w_p = \frac{q_p}{\Sigma_p q_p},$$

wherein $x_{pct}$ is the measured value of channel c of in-field PMU measurement device p at time step t and $\mu_{pc}$, is the expected value of in-field measurement device PMU p and channel c. After computing the deviation values $q_p$ for all in-field measurement devices p, the deviation values are normalized providing a relative importance $w_p$ for each in-field measurement device 3-$i$. This step can be seen as computing a normalized Euclidean distance between the observed measurements and the expected values of the steady state.

Figure 5:
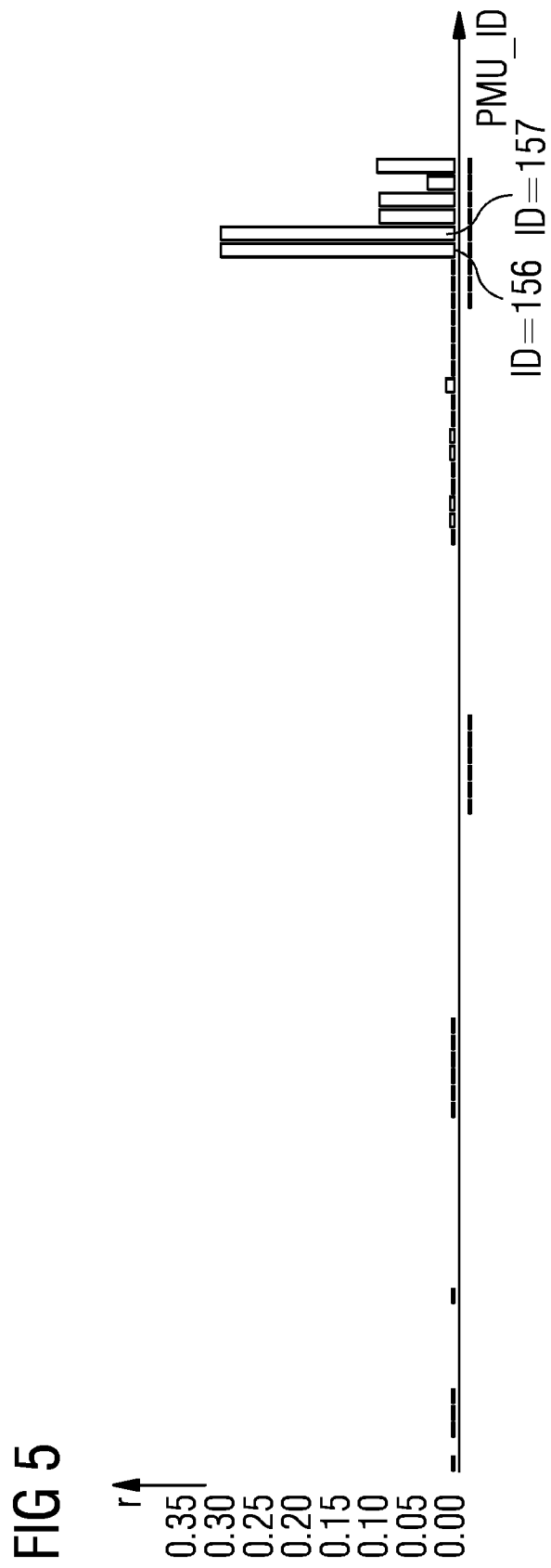
FIG. 5 shows a schematic diagram of an exemplary reference profile to illustrate the operation of a method and system for recognizing a contingency in a power supply network.

FIG. 5 illustrates importance scores or relevance r for in-field measurement 3-$i$ devices given the data MD of an observed contingency. Each bar of the diagram represents an importance of an in-field measurement device 3-$i$ such as a PMU for the observed contingency. The x-axis represents the different IDs of the in-field measurement devices. In the illustrated specific example, the in-field measurement devices with the IDs 156, 157 are most prominent indicating the importance or relevance for the observed contingency.

In a possible embodiment, a weighted cosine similarity can be used as a metric for computing a similarity between profiles as follows:

$$\cos(u, v, \hat{w}) = \frac{\Sigma_i \hat{w}_i u_i v_i}{\sqrt{\Sigma_i \hat{w}_i u_i^2} \sqrt{\Sigma_i \hat{w}_i v_i^2}}$$

wherein u and v are the global network states of two contingencies j and k and wherein $\hat{w}$ is a weight vector that is computed from two PMU importance scores from each contingency by taking the maximum of each value:

$$\hat{w}_i = \max(w_{ji} w_{ki})$$

After training the state estimator model, it is possible to build a reference database of a target contingency. It is possible to select the data of suitable target contingencies and construct a contingency profile for each of the target contingencies and store them in a database.

For each newly detected contingency within the power supply network 2, the measurement data MD is recorded and a contingency profile is computed using the state estimator model and the steady state. This candidate contingency profile CCP can be compared to all contingency profiles CPs stored in the reference database 5 using for instance the weighted cosine similarity metric as described above. The returned similarity computed by the computation unit 4C can be used to rank the contingency profiles with respect to their similarity to the input candidate contingency profile CCP. The similarity values indicate how similar an observed contingency within the power supply network 2 is to the corresponding contingency profiles stored in the reference database 5.

Figure 6:
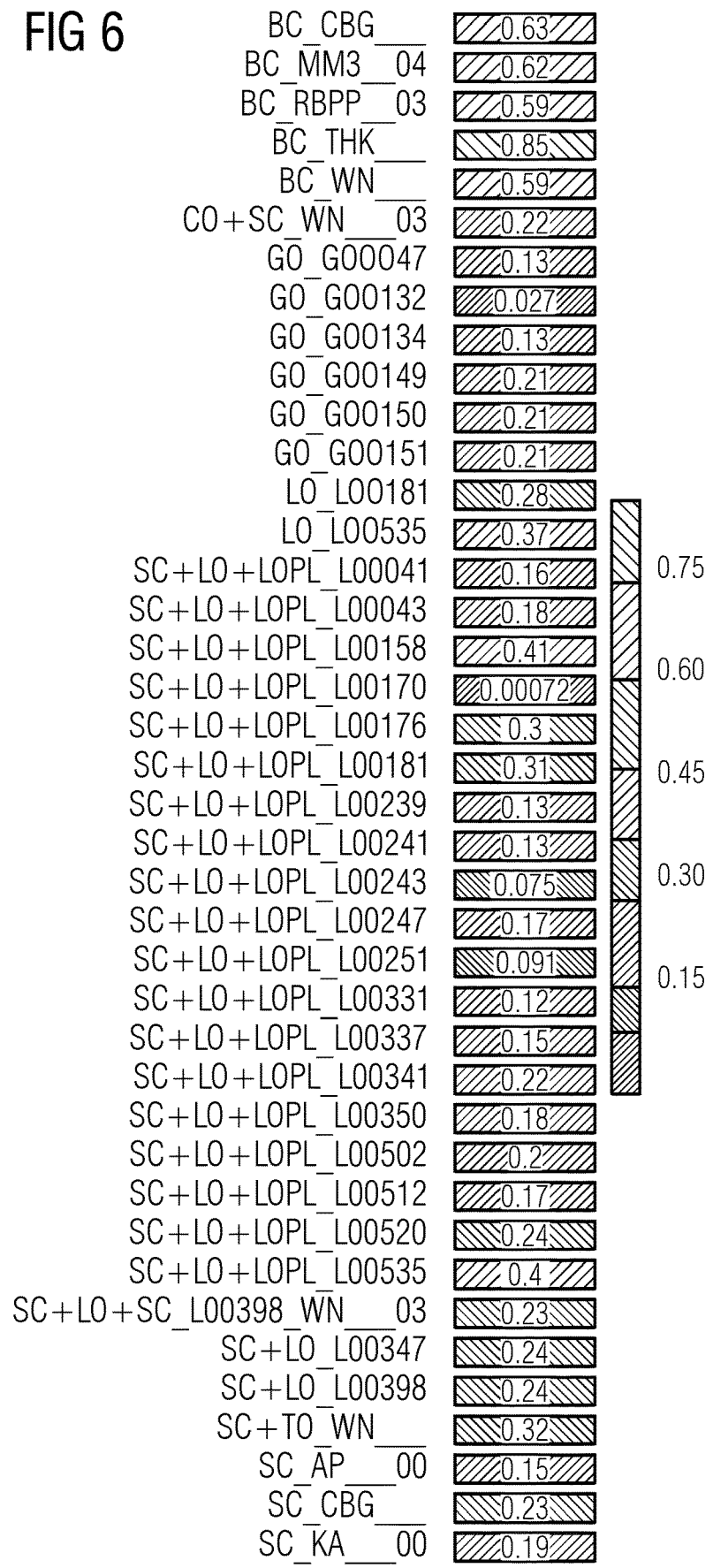
FIG. 6 shows schematically an example of a calculated final similarity of an observed contingency profile to reference contingency profiles stored in a reference contingency database.

FIG. 6 illustrates an example of a final similarity of an observed contingency to the contingencies stored in the reference database 5. Each field of FIG. 6 indicates how similar an observed contingency is to a corresponding contingency stored in the reference database 5. In FIG. 6, there are illustrated different contingency classes comprising for instance short circuits SC, line outages LO, generator outages GO or capacitor outages CO. With the method for recognizing contingency in a power supply network 2 according to the first aspect of embodiments of the present invention, it is possible to recognize a contingency in a power supply network 2 automatically and near real time with high reliability.

A model is learned for observations of single in-field measurement devices deriving a local network state representation that reflects an observation at the respective in-field measurement device 3-i. In-field measurement devices 3-i, in particular PMUs that are removed from the monitored power supply network 2 do not require a retraining of the state estimator model. If an in-field measurement device is removed from the power supply network 2, a local state representation for this removed in-field measurement device is not computed and the local state representations for the reference contingencies are removed from the reference database 5. Similar, outages of in-field measurement devices 3-i can be naturally treated by ignoring the local state representation for these in-field measurement devices 3-i. In this case, the local state representation of the in-field measurement device can be ignored in the reference contingencies when computing the similarities.

Since a general model is learned for local state representations observed by in-field measurement devices, it is possible to add and relocate in-field measurement devices at will without the need to retrain the model from scratch. All changes only influence the reference database 5 for which the state estimator model LNSM is applied on the new contingency data MD.

The system is flexible in the number of in-field measurement devices 3-i and associated local state representations LNSPs. It is possible to consider older contingencies with deviating number of in-field measurement devices 3-i when searching for a similar contingency in the reference database 5. This is of special importance if the reference database 5 is filled with real contingencies instead of simulated contingencies.

After having learned a general model that extracts local state representations from in-field measurement devices 3-i, the approach according to embodiments of the present invention can be even power network independent, applying the same trained model on various different power supply networks. Knowledge about the expected located of an observed contingency is considered explicitly by the method and system according to embodiments of the present invention when computing the similarity between two contingencies. This is especially important in scenarios where large power supply networks PSNs are monitored. In this scenario, effects of a contingency that can be observed by the in-field measurement devices 3-i can be very local, meaning that only a small portion of the placed in-field measurement devices 3-i will measure any kind of effects caused by the contingency. When comparing two contingencies only the local state representations LNSPs of those in-field measurement devices are considered which characterize the observed contingency. The local state representations of the remaining other in-field measurement devices do not contain any relevant information or measurement data MD and can consequently be ignored.

After having recognized a contingency, a control unit of a system can trigger countermeasures. Further, the recognized contingency can be output to a user via a graphical user interface of the monitoring system 1. After having initiated the countermeasures it can be observed whether the recognized contingency has been removed.

FIG. 1 shows a possible exemplary embodiment of a monitoring system 1 according to an aspect of embodiments of the present invention. The processing unit 4 of the monitoring system 1 can be implemented on a controller of the power supply network 2. Further, subunits of the processing unit 4 can also be implemented on distributed components connected to measurement devices 3-i of the power supply network 2. In a possible embodiment, the computation unit 4C of the processing unit 4 can output a reference contingency having the highest similarity with the observed contingency. In a possible embodiment, a control unit of the system 1 can generate automatically control signals CRTL depending on the recognized contingency to perform countermeasures to remove the recognized contingency in the power supply network 2. This control unit can provide control signals to control actuators within the power supply network 2, in particular switching means. For example, in response to a recognized contingency, switches can be triggered to switch off subsystems or components of the power supply network 2. Further, components or subsystems can be switched on to replace affected components of the power supply network 2. After having performed the switching, it can in a further step be evaluated whether the recognized contingency has been removed in the power supply network 2. The recognition of the contingency in the power supply network as well as the performance of the countermeasures can be performed automatically in real time.

Figure 7:
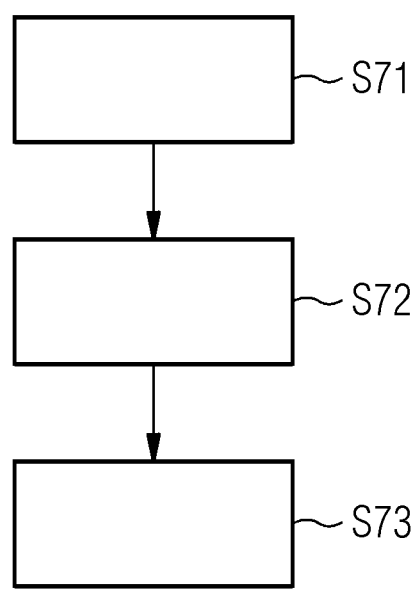
FIG. 7 shows a flowchart of an exemplary embodiment of a method for recognizing contingencies in a power supply network.

FIG. 7 shows a flowchart of a possible exemplary embodiment of the method for recognizing a contingency in a power supply network 2 according to a further aspect of embodiments of the present invention. In the illustrated embodiment of FIG. 7, the method for recognizing contingencies in the power supply network 2 comprises three main steps.

In a first step S71, measurement data MD generated by in-field measurement devices 3-i of the power supply network 2 are processed by associated neural attention models to provide a global network state profile GNSP of the power supply network 2 comprising for the in-field measurement devices 3-i of the power supply network 2 a class probability distribution over contingency classes.

In a further step S72, measurement data MD generated by the in-field measurement devices 3 of the power supply network 2 are processed to provide a relevance profile RP of the power supply network 2 comprising for the in-field measurement devices 3-$i$ a relevance distribution indicating a probability where the origin of the contingency within the power supply network 2 resides.

In a possible embodiment, step S71 and step S72 can be performed in parallel to reduce the required computation time for recognizing a contingency in the power supply network 2.

In a further step S73, the calculated global network state profile GNSP of the power supply network 2 and the calculated relevance profile RP of the power supply network 2 are compared with reference contingency profiles rCP stored in a reference contingency database 5 to recognize a contingency in the power supply network 2.

Each neural attention model associated with a corresponding in-field measurement device 3 can be used to calculate a local network state profile LNSP for the power supply network 2 at the respective in-field measurement device 3. In a possible embodiment, the local network state profiles LNSP of the different in-field measurement devices 3 are concatenated to provide the global network state profile GNSP of the power supply network 2.

The neural attention model LNSM comprises in a possible embodiment a convolutional layer CONL to smooth measurement data MD received by associated in-field measurement devices 3 of the power supply network 2. The neural attention model LNSM associated with a corresponding in-field measurement device 3 of the power supply network 2 comprises at least one recurrent neural network, RNN, layer to capture a time-dependency of the received measurement data MD. The neural attention model associated with an in-field measurement device 3 of the power supply network 2 comprises in a possible embodiment an attention layer which weights outputs of the last recurrent neural network, RNN, layer of the neural attention model with the output of an associated feed-forward attention subnetwork receiving channel-wise context information data indicating a steady state of the power supply network 2 at the respective in-field measurement device 3.

Figure 8:
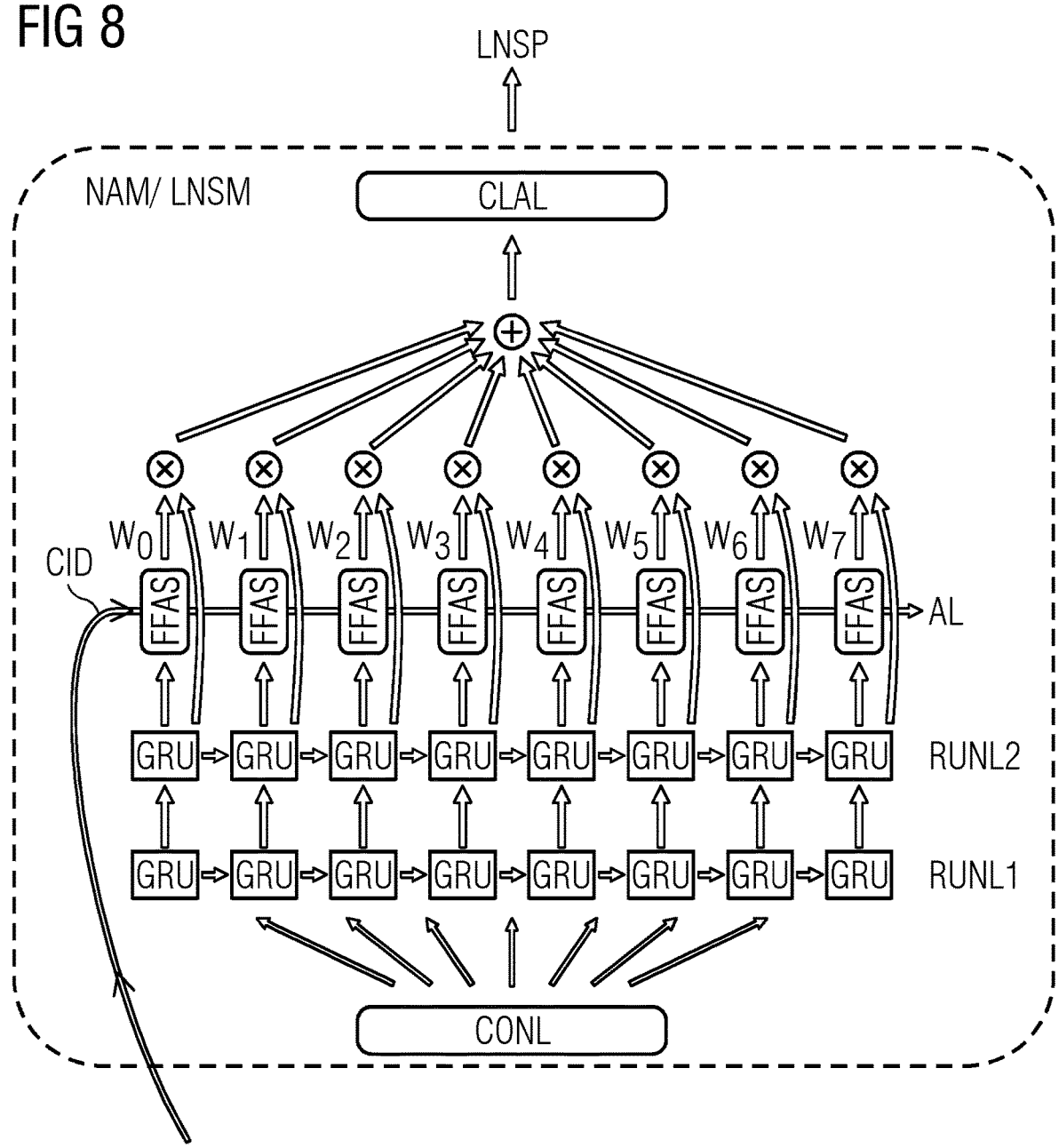
FIG. 8 shows a first schematic diagram illustrating an exemplary embodiment of a neural attention model as used by a monitoring system.

FIG. 8 shows schematically a neural attention model NAM which can be used by the method and system according to embodiments of the present invention. The neural attention model of FIG. 8 can form a local network state model LNSM as illustrated in FIG. 1.

As can be seen in the illustrated embodiment of FIG. 8, the neural attention model comprises a convolutional layer CONL adapted to smooth measurement data received by an associated in-field measurement device 3-$i$ of the power supply network 2. This convolutional layer CONL forms a component to increase noise robustness.

The neural attention model further comprises in the illustrated embodiment two recurrent neural network, RNN, layers which are adapted to capture a time-dependency of the received measurement data MD. Each recurrent neural network layer RNNL comprises gated recurrent units GRUs as illustrated in FIG. 8.

The neural attention model LNSM further comprises in the illustrated embodiment a classification layer CLAL adapted to weight the received outputs of the last recurrent neural network layer RNNL2 of said neural attention network to calculate a local network state profile LNSP for the power supply network 2 at the respective in-field measurement device 3 indicating a predicted class probability distribution over contingency classes. In the illustrated example of FIG. 8, the neural attention model LNSM associated with an in-field measurement device 3 of the power supply network 2 comprises an attention layer AL which weights ($w_0$-$w_7$) outputs of the last recurrent neural network layer RNNL2 of the neural attention model with the output of an associated feed-forward attention subnetwork FFAS receiving generalized context information data CID indicating a steady state SS of the power supply network 2 at the respective in-field measurement device 3. The neural attention model LNSM associated with the corresponding in-field measurement device 3 comprises the classification layer CLAL which receives the weighted outputs of the last recurrent neural network layer RNNL2 of said neural attention network to calculate a local network state profile LNSD for the power supply network 3 at the respective in-field measurement device 3 indicating a predicted class probability distribution over contingency classes.

Each reference contingency profile rCP stored in the reference contingency database 5 comprises a reference global network state profile rGNSP and a reference relevance profile rRP. A similarity metric SM indicating a similarity between a candidate contingency profile CCP formed by the global network state profile GNSP and the relevance profile RP of the power supply network 2 and a reference contingency profile rCP is computed for each reference contingency profile rCP stored in the reference contingency database 5 depending on the global network state profile GNSP of the candidate contingency profile CCP and depending on the global network state profile GNSP of the respective reference contingency profile rCP. The used similarity metric SM can comprise for instance a weighted cosine similarity metric SM.

In the monitoring system 1 according to embodiments of the present invention, a profile is computed for the observed contingency data wherein the profile consists of two main components. The first component of this computed profile, i.e. candidate contingency profile CCP, is a global network state profile GNSP indicating what kinds of contingencies are observed in the power supply network 2, i.e. the global network state profile GNSP can be regarded as a "what pattern" indicating what kind of contingencies are observed in the power supply network 2. The second component of the candidate contingency profile CCP is indicating which in-field measurement devices 3 are considered most relevant or important and can be seen as an indicator where the origin of the contingency in the power supply network 3 resides. Accordingly, the reference profile RP can be seen as a "where pattern" indicating where the observed contingency has occurred. The combination of the "what pattern" (global network state profile GNSP) and the "where pattern" (relevance profile RP) provides a clear and specific individual profile of a contingency in the power supply network 2 that can be automatically recognized given a set of reference contingency profiles rCP stored in a database 5.

Figure 9:
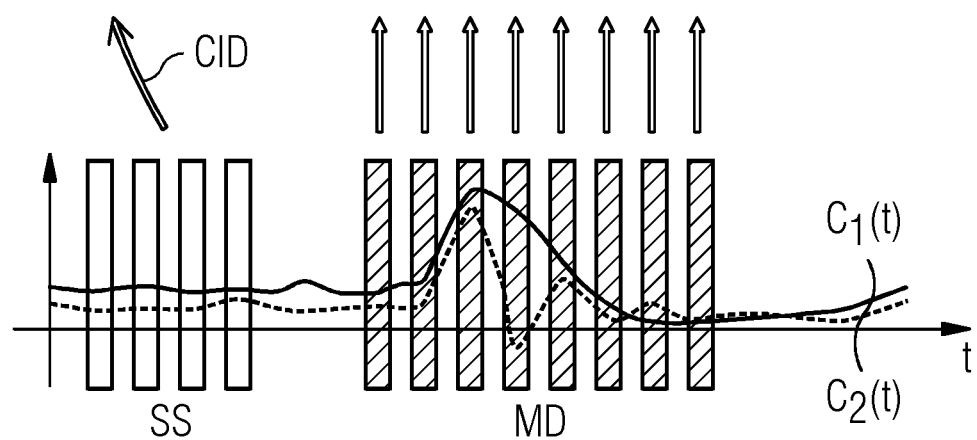
FIG. 9 shows a second schematic diagram illustrating an exemplary embodiment of a neural attention model as used by a monitoring system.

A possible embodiment of a neural attention model LNSM is illustrated in FIG. 8. The neural attention model LNSM comprises various subcomponents that increase the model's robustness toward expected disturbances like noise, time-dependencies and fuzzy anomaly detection that can have an impact on the contingency recognition quality. In addition, it produces interpretable local state representations that encode a probability distribution over contingency classes such as short circuit SC, line loss LL, generator outage GO, etc. This provides a better intuition about recognition of a target contingency. For achieving a high noise robustness, a channel-wise convolution is performed with a single filter on a time axis of the input measurement data MD of a single in-field measurement device 3. Accordingly, the neural attention model LNSM comprises as an input a convolutional layer CONL receiving the contingency signal or measurement data MD from the in-field measurement device 3 as illustrated in FIG. 9.

$$h_t^0 = \sum_i^s w_i X_{1+i} \qquad (1)$$

wherein X contains the preprocessed measurements of a single in-field measurement device. X is of shape channels× time and w is the filter vector of the shape s×s. The interpretation of the convolutional layer CONL is that of a basic moving window signal smoothing operator. Signal smoothing is used for counteracting noise in signals. In contrast to conventional fixed smoothing kernels, the applied smoothing can also be learned by the model autonomously.

The dependencies across time in the data are directly considered by using recurrent neural network layers RNNLs as illustrated in FIG. 8. In the illustrated embodiment, two recurrent neural network layers RNNL1, RNNL2 are stacked on top of the output of the convolutional layer CONL. Each recurrent neural network layer comprises gated recurrent units GRUs.

$$z_t^1 = \sigma(W_z^1 h_t^0 + U_z^1 h_{t-1}^1 + b_z^1)$$

$$r_t^1 = (W_r^1 h_t^0 + U_r^1 h_{t-1}^1 + b_r^1)$$

$$h_t^1 = (1-z_t^1) \circ \sigma_h(W_h^1 h_t^0 + U_h^1(r_t^1 \circ h_{t-1}^1) + b_h^1) + z_t^1 \circ h_{t-1}^1$$

$$z_t^2 = \sigma(W_z^2 h_t^1 + U_z^2 h_{t-1}^2 + b_z^2)$$

$$r_t^2 = (W_r^2 h_t^1 + U_r^2 h_{t-1}^2 + b_r^2)$$

$$h_t^2 = (1-z_t^2) \circ \sigma_h(W_h^2 h_t^1 + U_h^2(r_t^2 \circ h_{t-1}^2) + b_h^2) + z_t^2 \circ h_{t-1}^2$$

Please note that the superscript indicates the layer index. The formulas above correspond to a standard GRU formulation.

The neural attention model LNSM illustrated in FIG. 8 further comprises an attention mechanism which weights the importance of the outputs of the last recurrent neural network layer RNNL2.

$$h^3 = \sum_t^T f_{att}(h_t^2, C) \cdot h_t^2$$

with $$f_{att}(h, C) = \varphi(W_{att}^1 \varphi(W_{att}^0 [h; C] + b_{att}^0) + b_{att}^1)$$

For this, each output of the last recurrent neural layer RNNL2 is combined with context information $C_p$. Context information in the illustrated embodiment is formed by the steady state, SS, signal provided by the respective in-field measurement device 3 indicating a normal operation state of the power supply network 2 at the location of the in-field measurement device 3. The steady state signal SS of an in-field measurement device 3 forms context information data CID that can be stored locally in a buffer and can be read from the buffer in case that a contingency is observed providing a contingency signal MD. This context information CID can be applied to the attention subnetworks FFAS as shown in FIG. 8A. The context information data CID can be supplied channel-wise. In the illustrated example of FIG. 9, the signal diagram has two channels c1, c2.

The output of the attention subnetwork FFAS $f_{att}(h, C)$ is a single weight w that is multiplied with the output of the corresponding output from the last recurrent neural network layer RNNL2 as shown in FIG. 8. Finally, the sum of the weighted outputs is computed to produce a single output vector ($h^3$). The intuition behind this mechanism is as follows. Assuming that the anomaly detection triggers too early and e.g. half of the time window given to the model does not contain any anomalous data then it is desired that the algorithm does ignore the first half of the received data automatically and does focus on that part of the received data that includes the important information. The model does learn the behavior automatically from data to be able to decide autonomously when applied on new incoming measurement data MD. This is what the attention mechanism AL after the last recurrent neural network layer RNNL2 is performing. Given some context (i.e. steady state) CID and what the model knows so far, i.e. the output of the recurrent neural network layer RNNL2, it can reevaluate and weight the importance of the output at time step t, before performing a final classification using the classification layer CLAL.

The contingency class can be finally predicted by:

$$\hat{y} = \phi(W^4 h^3 + b^3) \text{ with } \phi(x)_c = \frac{e^{x_c}}{\sum_c e^{x_c}}$$

The classification layer CLAL provides a predicted probability for each contingency class. This can be used as a local network state profile LNSP.

The neural attention model LNSM as illustrated in FIG. 8 can be learned end-to-end, meaning that all components are learned at once. For training of the neural attention model, it is possible to use a complete set of measurements of a single in-field measurement device 3 as one training example which can be labeled with the class of a contingency. For example, considering a power supply network 2 monitored by 100 in-field measurement devices 3, a contingency Short Circuit Line can result in 100 examples or example datasets wherein each dataset can be labeled with Short Circuit SC. In addition, one can perform random crops during training on the examples (on the time axis) extracting fixed length windows that can for instance span about 0.5 seconds from the interval [−0.25; 0.75], wherein −0.25 points to time steps that lie up to 0.25 seconds before the actual contingency has happened in the power supply network 2. For each training example or dataset, one can perform two random crops, wherein it is enforced that the representations produced for the classification layer CLAL are of high similarity. This can be accomplished by minimizing an additive cost function that penalizes the combination of representation dissimilarity and classification error of both crops.

$$L(X, y, \theta) =$$
$$-\sum_i y_i \log(f_\theta(X_{i,1})) - y_i \log(f_\theta(X_{i,2})) + \beta \cdot f_{sim}(g_\theta(X_{i,1}), g_\theta(X_{i,2}))$$

wherein $f_\theta$ is the neural attention model LNSM parameterized by θ and y is the label of example dataset i.

$X_{i,1}$, $X_{i,2}$ are the cropped examples and $f_{sim}$ is a similarity function between the representations computed from the cropped examples by the neural attention model LNSM without applying the classification layer CLAL ($h^4$). Further, $g_\Theta$ is the function of the sub neural network that computes these representations. Further, $\beta$ is a scalar that weights the impact of the similarity condition. The cost function can be minimized with stochastic gradient descent using for instance the ADAM step rule.

The neural attention model LNSM as illustrated in FIG. 8 predicts for the measurement data MD of each individual in-field measurement device 3 a distribution over contingency classes defining as such, for example short circuits SC, line outages LO or generator outages GO to give come exemplary contingency classes. Note that in contrast to conventional approaches (e.g. tensor factorization), these contingency classes provide interpretable meaning. Further, it is possible to include a specific class for "Nothing happened" which allows to react properly on false alarms.

Figure 10:
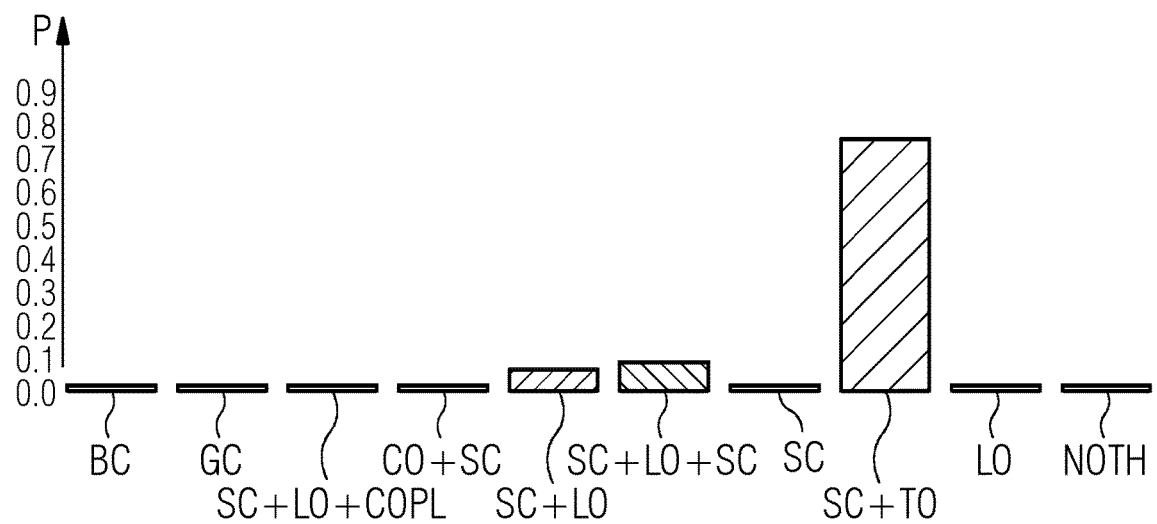
FIG. 10 shows a schematic diagram for illustrating a soft classification with confidences for a single in-field measurement device for illustrating the operation of a method and apparatus.

FIG. 10 shows a soft classification with confidences or probability values P for a single in-field measurement device 3 within the power supply network 2. The diagram of FIG. 10 illustrates the probability P for different contingency classes such as BC (Bus Bar Trip) or General Outage (GO). In the illustrated example, the contingency class SC+TO is most prominent and comprises the highest probability P. FIG. 10 is a local network state profile LNSP illustrating a local network state LNS within the power supply network 2 at the location of the respective in-field measurement device 3.

Figure 11:
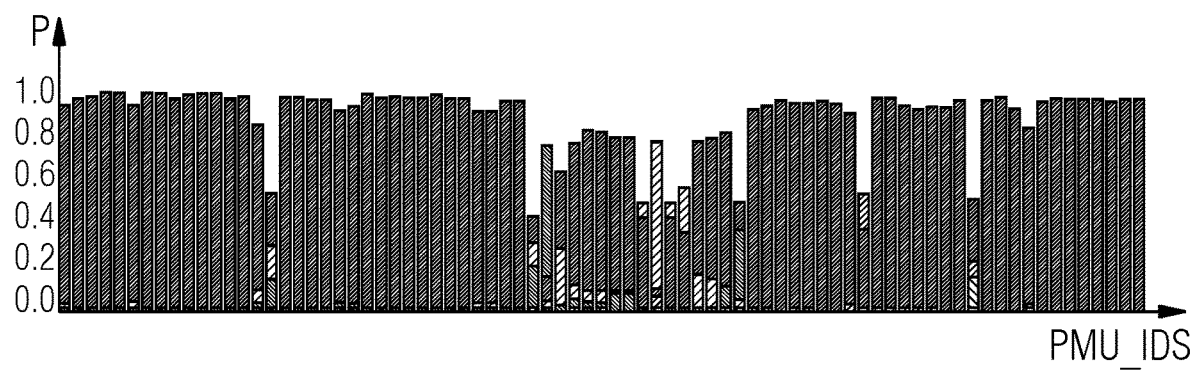
FIG. 11 shows a further schematic diagram for illustrating a soft classification with confidences for in-field measurement devices for illustrating the operation of a method and system for recognizing contingencies in a power supply network.

In a possible embodiment, a global representation of the network state can be formed by concatenation of all local network state profiles LNSPs as illustrated in FIG. 10. A global network state profile GNSP which can be used by the system is illustrated in FIG. 11. FIG. 11 shows a diagram illustrating a soft classification with confidences for each in-field measurement device 3. Each bar represents a class distribution of a single in-field measurement device 3 as shown in FIG. 10.

In a possible embodiment, an importance weighting for each in-field measurement device 3 placed in the power supply network 2 can be computed in parallel based on the preprocessed data, i.e. the signals received from the in-field measurement devices 3 which have been rescaled and only contain the deviation from an expected value of the steady state SS.

FIG. 5 illustrates a diagram for illustrating an importance or relevance r of different in-field measurement devices 3 for an observed contingency. After having trained a state estimator model, it is possible to build a reference database of target contingencies to be detected in a power supply network 2. To achieve this, it is possible to select the data of suitable target contingencies and construct a contingency profile for each of the target contingencies and store them in a contingency database.

The contingency profiles can be compared in three substeps.

First, a cosine similarity between the "what pattern" (global network state profile GNSP) and the "what pattern" of the target contingency stored in the database 5 is computed as follows:

$$\cos(u, v) = \frac{\Sigma_i u_i v_i}{\sqrt{\Sigma_i u_i^2}\sqrt{\Sigma_i v_i^2}}$$

Further, a cosine similarity between the "where pattern" of the reference contingency and the "where pattern" of the target contingency is computed as follows:

$$\cos(h, k) = \frac{\Sigma_i h_i k_i}{\sqrt{\Sigma_i h_i^2}\sqrt{\Sigma_i k_i^2}}$$

In the last substep, these two similarity scores can be combined. This can be performed for example by taking the mean of both values to get the similarity between the reference contingency and the target contingency:

$$sim(r, t) = \frac{\cos(u, v) + \cos(h, k)}{2}$$

Figure 12:
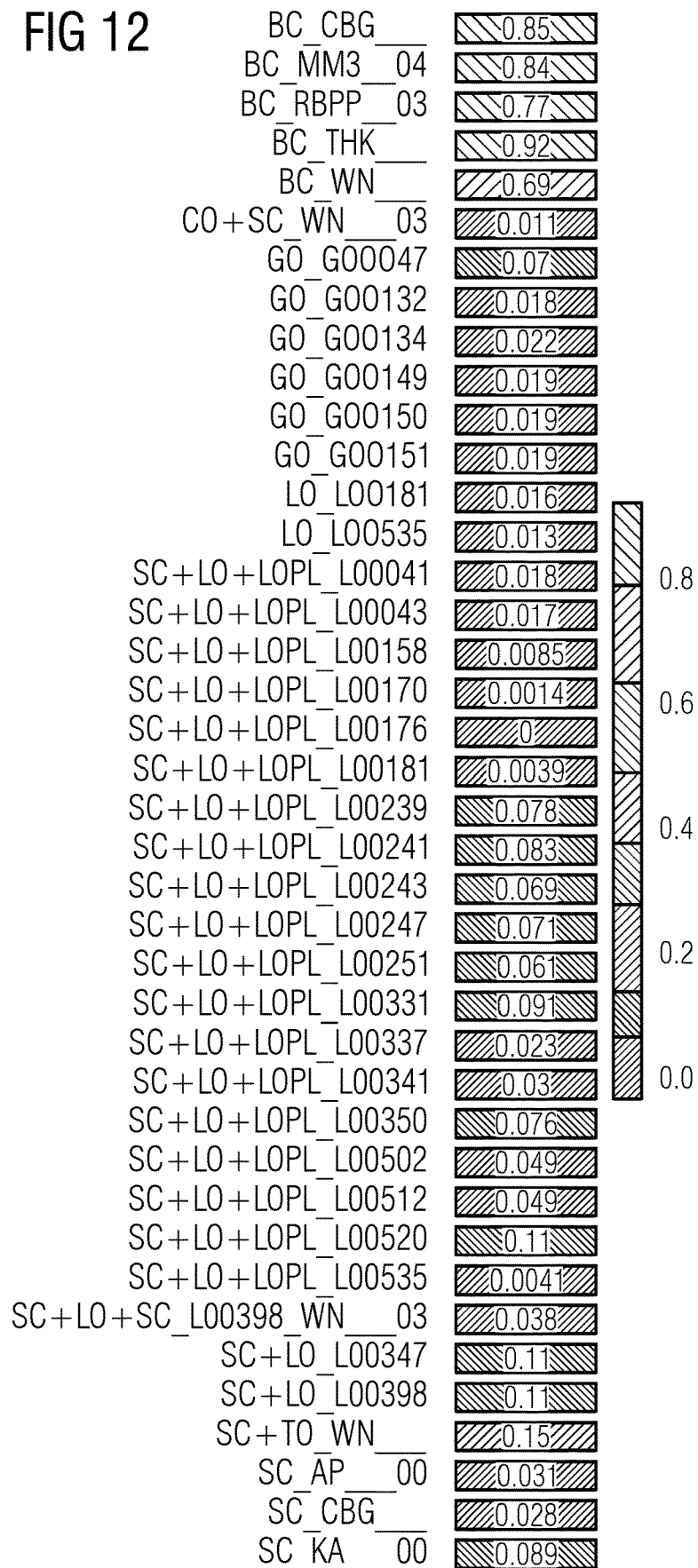
FIG. 12 illustrates a similarity comparison of target soft classification patterns against soft classification patterns of known reference contingencies.
Figure 13:
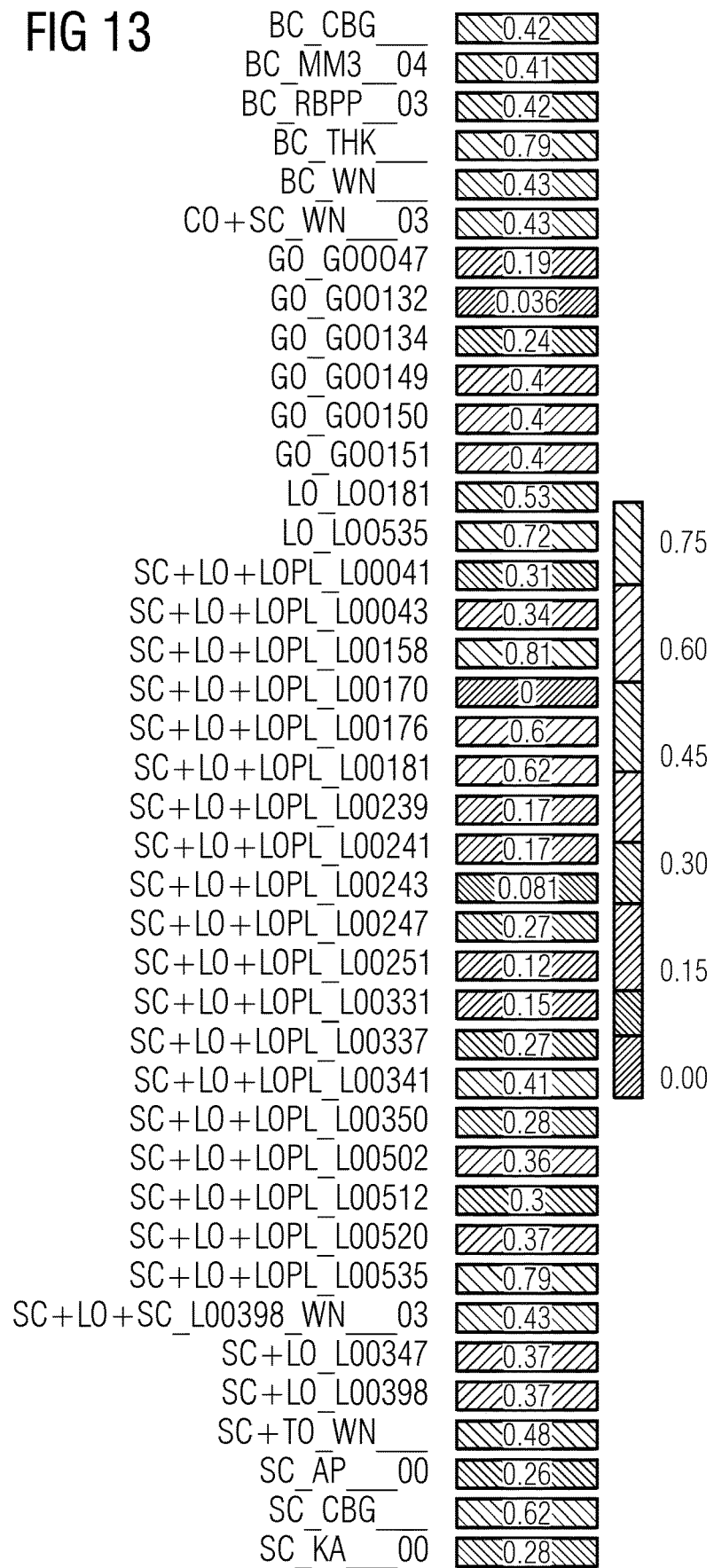
FIG. 13 illustrates a similarity comparison of target soft classification patterns against soft classification patterns of known reference contingencies.
Figure 14:
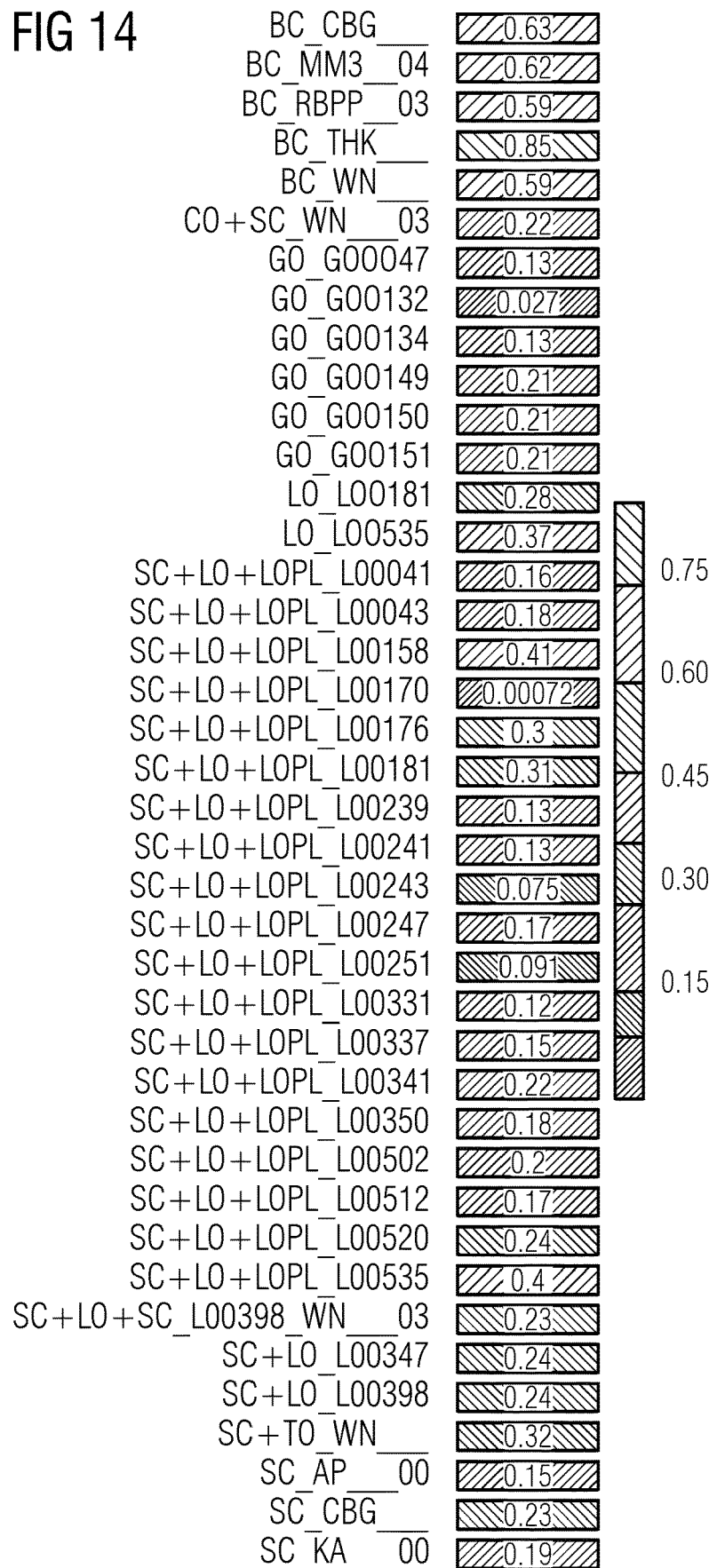
FIG. 14 shows a schematic diagram showing a final similarity of input contingency data to known reference contingencies by combining similarities from a soft classification pattern with similarities of a location pattern.
Figure 15:
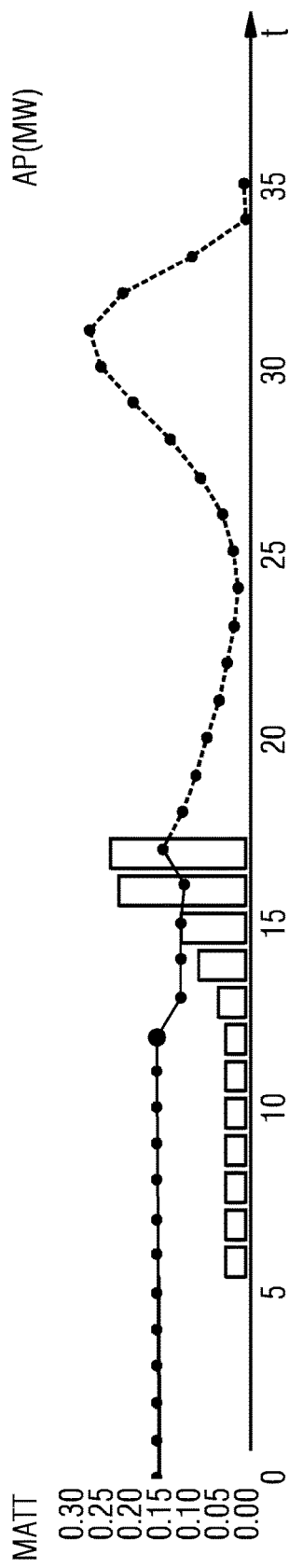
FIG. 15 shows an attention mechanism of a neural attention model as illustrated in FIG. 8.
Figure 16:
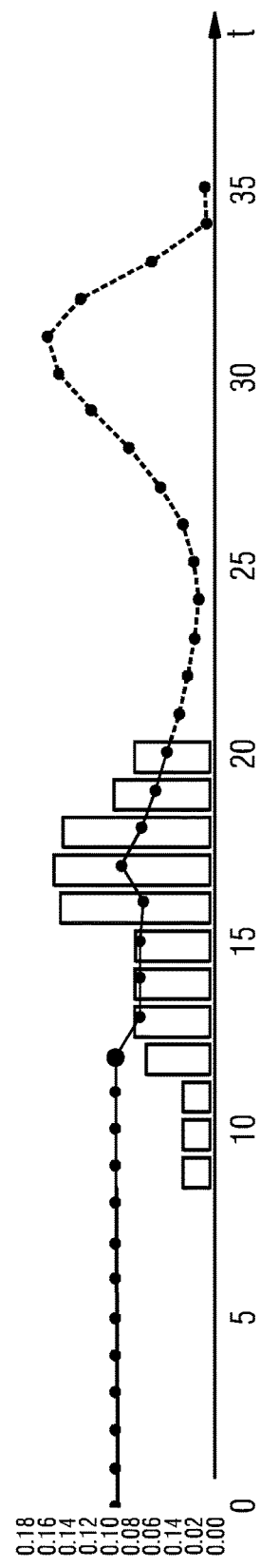
FIG. 16 shows an attention mechanism of a neural attention model as illustrated in FIG. 8.

An example of this approach is shown in FIGS. 12, 13 (substep 1 and substep 2) and in FIG. 14 (substep 3).

FIG. 12 illustrates a similarity comparison of a target soft classification pattern ("what pattern") against soft classification pattern of known reference contingencies.

FIG. 13 illustrates a similarity comparison of a target location pattern ("where pattern") against location pattern of known reference contingencies.

Further, FIG. 14 illustrates a final similarity of input contingency data to known contingencies by combining the similarities from the soft classification pattern with the similarities of the location pattern. In the illustrated specific example, the recognized contingency of the power supply network is BC_THK having a similarity score of 0.85.

In the method and system according to embodiments of the present invention, for each newly detected contingency the measurement data MD can be recorded and a corresponding contingency profile can be computed using a state estimator model and a steady state. This profile can be compared to all profiles in a reference database using for instance a cosine similarity-based similarity metric SM as described above. The returned similarity can be used to rank the candidate contingencies with respect to their similarity to the input contingency profile. The similarity values indicate how similar an observed contingency is to the corresponding contingency stored in the reference database 5.

An aspect of embodiments of the present invention lies in improving the network state representation ("what pattern") and making it more robust to variations in the input data. This can be accomplished by two features of embodiments of the present invention. The generation of interpretable local pattern (e.g. distribution of contingency classes) that describe the local belief of an in-field measurement device 3 what contingency has happened and the neural attention mechanism.

Figure 17:
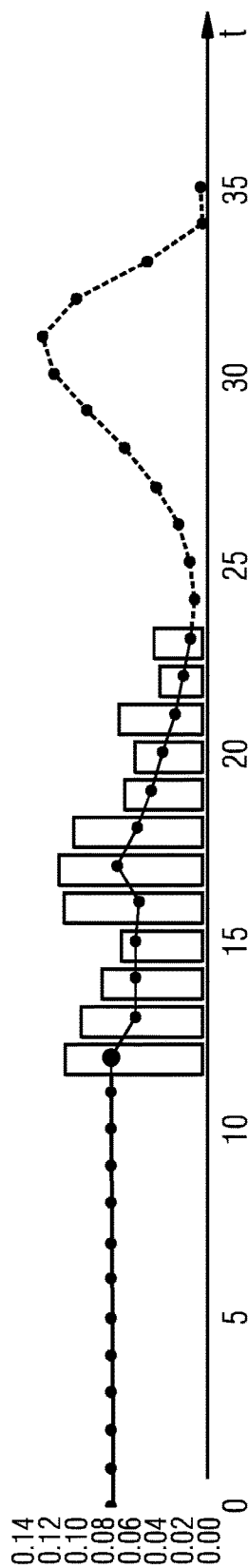
FIG. 17 shows an attention mechanism of a neural attention model as illustrated in FIG. 8.
Figure 18:
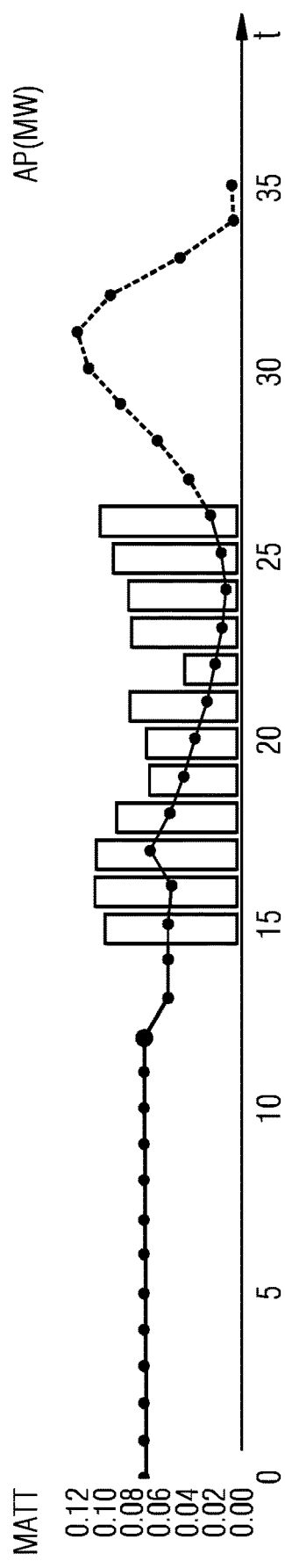
FIG. 18 shows an attention mechanism of a neural attention model as illustrated in FIG. 8.
Figure 19:
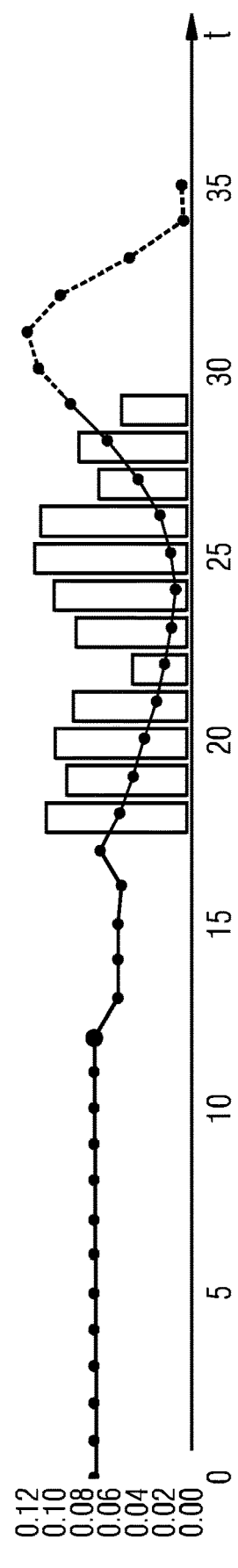
FIG. 19 shows an attention mechanism of a neural attention model as illustrated in FIG. 8

FIGS. 15-19 illustrate an attention mechanism of the neural attention model LNSM as shown in FIG. 8. The attention mechanism (model attention MATT) is demonstrated with actual data simulated for an electrical grid 2 that mimics a real electrical grid. For better visualization, only a raw active power AP signal is illustrated. The model is actually applied on an artificially noised variant of this signal. The five images of FIGS. 15-19 show the behavior of the attention mechanism for five different scenarios where it is assumed that the anomaly detection algorithm may fail to determine the correct start of the anomaly (indicated by a dot) except for the third case as shown in FIG. 17. The first part of the curve is the part of the signal the neural attention model is fed with. For example, in the first image of FIG. 15, it is assumed that the anomaly detection determines the start of the anomaly or contingency six time steps too early. In the last image (FIG. 19), the anomaly detection determines the anomaly six time steps too late. It can be seen that the attention of the model (shown by bars) is highly dynamic indicating that the model is aware of the varying information content of the fed data. This can be seen in the first two images (FIG. 15, 16) where the data that does not belong to the actual contingency is given a low attention since it does not contain any information that does characterize the subsequent contingency. Due to this dynamic awareness, the model has a much higher tolerance to variations in the input data leading to a superior robustness compared to conventional methods.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for recognizing a contingency in a power supply network, the method comprising the steps of:
   (a) processing measurement data generated by in-field measurement devices of the power supply network by a local network state estimation model to calculate local network state profiles, wherein the local network state estimation model is a trained neural network;
   (b) generating a global network state profile from the local network state profiles, wherein the global network state profile includes a class probability distribution over contingency classes for in-field measurement devices of the power supply network;
   (c) processing the measurement data generated by the in-field measurement devices of the power supply network to provide a relevance profile comprising for the in-field measurement devices a relevance distribution indicating a probability where an origin of a contingency within the power supply network resides;
   (d) computing a similarity between a candidate contingency profile and a reference contingency profile, wherein:
      the candidate contingency profile is formed by the generated global network state profile and by the calculated relevance profile, and
      the reference contingency profile is stored in a reference contingency database configured to provide data to a computation unit that is configured to identify that the reference contingency profile has a highest computed similarity as the recognized contingency; and
   (e) initiating at least one countermeasure to remove the recognized contingency in the power supply network.

2. The method according to claim 1, wherein the local network state profile comprises a local contingency class probability profile comprising for the in-field measurement devices a class probability distribution over contingency classes.

3. The method according to claim 1, wherein the local network state profile comprises a local latent contingency profile.

4. The method according to claim 1, wherein the in-field measurement devices comprise phasor measurement unit, which provide time series of measurement data in different measurement channels.

5. The method according to claim 1, wherein the local network state estimation model is formed by a model which generates a latent feature representation for the local network state.

6. The method according to claim 1, wherein each reference contingency profile stored in the reference contingency database comprises a reference global network state profile and a reference relevance profile.

7. The method according to claim 6, wherein a similarity metric, SM, indicating a similarity between the candidate contingency profile and a reference contingency profile is computed for each reference contingency profile stored in the reference contingency database depending on the global network state profile of the candidate contingency profile and depending on the global network state profile of the respective reference contingency profile.

8. The method according to claim 7, wherein the used similarity metric comprises a weighted cosine similarity metric.

9. The method according to claim 1, wherein the measurement data generated by each in-field measurement device of the power supply network is preprocessed to provide a standard deviation of the measurement data from an expected value in a steady state for each measurement channel of the respective in-field measurement device.

10. The method according to claim 9, wherein the preprocessed measurement data is rescaled by dividing it through the channel and in-field measurement device specific standard deviation.

11. The method according to claim 9, wherein a relevance weight is calculated for each in-field measurement device by normalizing the standard deviation of the measurement data of the respective in-field measurement device to provide the relevance profile.

12. The method according to claim 1, wherein the local network state estimation models are trained with measurement data of observed contingencies of the power supply network.

13. The method according to claim 1, wherein each of the local network state profiles is calculated at a respective in-field measurement device.

14. The method according to claim 13, wherein the local network state profiles are concatenated to provide the global network state profile.

15. The method according to claim 14, wherein the contingency is a kind of contingency selected from the group consisting of a short circuit, a line outage, a generator outage and a capacitor outage.

16. The method according to claim 15, wherein the global network state profile indicates what kind of contingency is observed in the power supply network.

17. A monitoring system for recognizing a contingency in a power supply network, the monitoring system comprising:
   in-field measurement devices for generating measurement data of the power supply network and
   a processing unit for processing the measurement data generated by the in-field measurement devices of the power supply network by using a local network state estimation model to calculate local network state profiles used to generate a global network state profile, wherein the global network state profile includes a class probability distribution over contingency classes for in-field measurement devices of the power supply network, and wherein the local network state estimation model is a trained neural network;

wherein the processing unit processes the measurement data generated by the in-field measurement devices of the power supply network to provide a relevance profile comprising for the in-field measurement devices a relevance distribution indicating a probability where an origin of a contingency within the power supply network resides; wherein the processing unit computes a similarity between a candidate contingency profile and a reference contingency profile, wherein:

the candidate contingency profile is formed by the generated global network state profile and by the calculated relevance profile, and the reference contingency profile is stored in a reference contingency database of the monitoring system configured to provide data to a computation unit that is configured to identify that the reference contingency profile has a highest computed similarity as the recognized contingency within the power supply network.

18. The monitoring system according to claim 17, wherein the in-field measurement devices comprise phasor measurement units, which provide time series of measurement data in different measurement channels.

* * * * *